US 6,634,991 B2

United States Patent
Itou et al.

(10) Patent No.: US 6,634,991 B2
(45) Date of Patent: Oct. 21, 2003

(54) HYDRAULIC CONTROL UNIT FOR AUTOMATIC TRANSMISSION

(75) Inventors: Masahiro Itou, Anjo (JP); Naoyuki Fukaya, Anjo (JP); Mikio Iwase, Anjo (JP); Kazuhisa Ozaki, Anjo (JP); Hiromichi Kimura, Toyota (JP); Yoshihiro Iijima, Toyota (JP); Kazuyuki Watanabe, Toyota (JP); Shigeki Hiramatsu, Toyota (JP); Koichi Tanaka, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/850,171

(22) Filed: May 8, 2001

(65) Prior Publication Data

US 2002/0025886 A1 Feb. 28, 2002

(30) Foreign Application Priority Data

May 31, 2000 (JP) ........................... 2000-163416

(51) Int. Cl.[7] .................. F16H 61/26; F16H 61/16; F16H 61/18; F16H 31/00
(52) U.S. Cl. ................ 477/156; 477/160; 477/163; 477/164; 477/125; 475/119; 475/120; 475/123; 701/62
(58) Field of Search ................. 477/156, 160, 477/163, 164, 125, 131, 138, 143; 475/119, 120, 123, 128; 701/62

(56) References Cited

U.S. PATENT DOCUMENTS

| 4,073,203 A | * | 2/1978 | Wurst et al. ........... 477/129 |
|---|---|---|---|
| 4,494,423 A | | 1/1985 | McCarthy et al. ...... 74/869 |
| 4,527,448 A | | 7/1985 | Person et al. ........ 74/869 |
| 4,541,308 A | | 9/1985 | Person et al. ........ 74/868 |
| 4,628,771 A | | 12/1986 | Person et al. ........ 74/856 |
| 4,903,551 A | | 2/1990 | Hiramatsu et al. ..... 74/869 |
| 5,010,786 A | * | 4/1991 | Hiramatsu et al. ..... 477/134 |
| 5,293,790 A | * | 3/1994 | Ohashi et al. ........ 477/131 |
| 5,538,479 A | | 7/1996 | Niiyama .............. 475/128 |
| 5,649,880 A | * | 7/1997 | Tsutsui et al. ........ 477/109 |
| 6,024,671 A | * | 2/2000 | Sawa et al. .......... 477/131 |
| 6,302,822 B1 | * | 10/2001 | Suzuki et al. ........ 477/143 |
| 6,319,165 B1 | * | 11/2001 | Itou et al. ........... 475/119 |

FOREIGN PATENT DOCUMENTS

| JP | 2689421 | 8/1997 |
| JP | 9-303545 A | 11/1997 |
| JP | 2000-170899 A | 6/2000 |
| JP | 2000-170900 A | 6/2000 |
| JP | 2001-280456 | 10/2001 |

* cited by examiner

Primary Examiner—Tisha D. Lewis
(74) Attorney, Agent, or Firm—Oliff & Berridge, PLC (57) ABSTRACT

A hydraulic control unit including a hydraulic servo for engaging and disengaging each friction engagement element, hydraulic pressure supply device for supplying hydraulic pressure to a hydraulic servo of a predetermined friction engagement element selected according to a gearshift position to be achieved, failure detection device for detecting a failure has occurred in the hydraulic pressure supply device, and fail-safe device for preventing interlock that occurs due to a plurality of friction engagement elements being engaged, and also prevents a gearshift from a high-speed position to a low-speed position, when the failure detection device detects that a failure has occurred.

12 Claims, 5 Drawing Sheets

| SHIFT POSITION | | | SOLENOID VALVES | | | | | | CLUTCHES | | | | BRAKES | | | OWC | |
|---|---|---|---|---|---|---|---|---|---|---|---|---|---|---|---|---|---|
| | | | S4 | S5 | DSL | SL1 | SL2 | SL3 | C0 | C1 | C2 | C3 | B1 | B2 | B3 | F1 | F2 |
| P | | | X | X | X | O | O | O | X | X | X | X | X | X | O | X | X |
| R | | | X | X | X | O | O | O | X | X | O | X | X | O | O | X | X |
| R (INHIBIT) | | | O | O | X | O | O | O | X | X | X | X | X | X | X | X | X |
| N | | | X | X | X | O | O | O | X | X | X | X | X | X | O | X | X |
| D | 1st | | X | X | X | O | O | X | X | O | X | X | X | X | O | O | O |
| | 2nd | | X | X | X | X | O | X | X | O | X | X | O | X | O | X | O |
| | 3rd | | X | O | ◎ | O | O | X | O | O | X | X | X | X | O | X | O |
| | 4th | | X | O | ◎ | O | O | O | X | O | X | X | O | X | O | X | O |
| | 5th | | O | O | ◎ | X | ◎ | O | O | X | X | O | O | X | X | X | X |
| 3 | 1st | | X | X | X | O | ◎ | X | X | O | X | X | X | X | O | O | O |
| | 2nd | | X | X | X | X | O | X | X | O | X | X | O | X | O | X | O |
| | 3rd | | X | O | ◎ | O | ◎ | X | O | O | X | X | X | X | O | X | O |
| 2 | 1st | | X | X | O | O | O | X | X | O | X | X | O | O | O | O | O |
| | 2nd | | X | X | X | X | O | X | X | O | X | X | O | X | O | X | O |
| D,3 | GEARSHIFT POSITION WHEN ALL SOLENOIDS ARE OFF | APPROXIMATE 4th | X | X | X | X | X | X | O | O | X | O | X | X | X | X | X |
| 2 | | 3rd | X | X | X | X | X | X | O | O | X | X | X | X | O | X | O |
| REMARKS | O | | ON | | | | | | ENGAGED | | | | | | | LOCKED | |
| | X | | OFF | | | | | | DISENGAGED | | | | | | | FREE | |
| | ◎ | | ON=LOCK-UP ON OFF=LOCK-UP OFF | | | | | | — | | | | | | | — | |

HYDRAULIC CONTROL UNIT FOR AUTOMATIC TRANSMISSION

BACKGROUND OF THE INVENTION

1. Field of Invention

The invention relates to a hydraulic control unit for an automatic transmission.

2. Description of Related Art

Conventional automatic transmissions used in automobiles and other vehicles are equipped with a transmission device provided with a planetary gear unit and other parts. Such a transmission device is provided with a plurality of friction engagement elements including a clutch and a brake and, making each of these friction engagement elements engage or disengage in a predetermined combination causes an output of rotation to be produced selectively from gear elements, such as a sun gear, ring gear, and carrier of the planetary gear unit to achieve a plurality of gearshift positions.

Each of the friction engagement elements is engaged or disengaged by operating a hydraulic servo of a hydraulic circuit. The hydraulic servo is provided with a hydraulic servo drum having an outer peripheral wall and an inner peripheral wall, and an annular piston fitted slidably into the hydraulic servo drum, etc. By supplying oil to, and discharging it from, an application oil chamber formed between the hydraulic servo drum and the annular piston, the annular piston is moved, thereby engaging or disengaging a friction engagement element disposed to be opposed to the annular piston.

Also, solenoid valves and selector valves, etc. of various kinds are disposed in the hydraulic circuit. When the solenoid of a predetermined solenoid valve is turned ON or OFF, a predetermined selector valve is selected and hydraulic pressure is supplied to, or exhausted from, a hydraulic servo connected to the corresponding selector valve.

However, the automatic transmission of such a configuration is designed to cause one or more specific friction engagement elements to be engaged to achieve a certain gearshift position. If, however, a solenoid valve fails and a friction engagement element that should not be engaged is engaged, then interlock occurs in the transmission device. A hydraulic circuit is therefore provided in which, if a hydraulic pressure is about to be supplied to a hydraulic servo of a friction engagement element which should not be engaged, that hydraulic pressure is used to select a predetermined selector valve, thereby preventing the hydraulic pressure from being supplied to the hydraulic servo and thus preventing interlock from occurring in the transmission device (See Japanese Patent Application Laid-Open Publication SHO 63-210443).

In the conventional automatic transmission, however, interlock can be prevented from occurring in the transmission device in a condition in which a friction engagement element that should not be engaged is engaged, that is, a condition in which a failure has occurred due to hydraulic pressure being supplied to the hydraulic servo. However, in a condition in which a friction engagement element that should be engaged is not engaged, that is, in a condition in which failure has occurred due to hydraulic pressure not being supplied to the hydraulic servo, a neutral condition is established in the transmission device depending on the type of the automatic transmission, and therefore power drive cannot be transmitted via the transmission device. This could result in not only a desired gearshift not being performed properly, but also the vehicle not being able to be moved.

In addition, depending on the solenoid valve that has failed, a gearshift from a high-speed gear position such as 4th speed or 5th speed, to a low-speed gear position such as 1st speed or 2nd speed, is made, thus applying large engine braking and generating gearshift shock.

SUMMARY OF THE INVENTION

To overcome the problems of the conventional automatic transmission, the invention provides a hydraulic control unit for an automatic transmission that can prevent interlock from occurring in the transmission device, prevent a neutral condition from being established in the transmission device, prevent a gearshift from a high-speed gear position to a low-speed gear position from being made, and prevent gearshift shock from being generated.

To achieve the foregoing, a hydraulic control unit for an automatic transmission according to an exemplary aspect of the invention is provided with hydraulic servos, each of which engages and disengages respective friction engagement elements, hydraulic pressure supply means which supplies hydraulic pressure to a hydraulic servo of a predetermined friction engagement element selected according to a gearshift position to be achieved, failure detection means that detects that a failure has occurred in the hydraulic pressure supply means, and fail-safe means that prevents interlock from occurring due to a plurality of friction engagement elements engaging, and prevents a shift from a high-speed gear position to a low-speed gear position when the failure detection means detects that a failure has occurred.

In this case, when the failure detection means detects that a failure has occurred in a hydraulic pressure supply means, interlock occurring as a result of a plurality of friction engagement elements being engaged is prevented from occurring. A predetermined gearshift position on the high-speed position side is then achieved.

Accordingly, since gearshifting from a high-speed position to a low-speed position is prevented along with the prevention of the occurrence of interlock, a large engine braking being applied is prevented. As a result, the generation of gearshift shock is prevented.

Another hydraulic control unit for an automatic transmission according to another exemplary aspect of the invention is provided with hydraulic servos, each of which engages and disengages respective friction engagement elements, hydraulic pressure supply means which supplies hydraulic pressure to a hydraulic servo of a predetermined friction engagement element selected according to a gearshift position to be achieved, failure detection means that detects that a failure has occurred in the hydraulic pressure supply means, and fail-safe means that prevents a neutral condition from being established, and prevents a gearshift from a high-speed gear position to a low-speed gear position when the failure detection means detects that a failure has occurred.

In this case, when the failure detection means detects that a failure has occurred in a hydraulic pressure supply means, the establishment of a neutral condition is prevented. A predetermined gearshift position on the high-speed position side is then achieved.

Accordingly, since gearshifting from a high-speed position to a low-speed position is prevented along with the prevention of the establishment of a neutral condition, a large engine braking being applied is prevented. As a result, the generation of gearshift shock is prevented.

Still another hydraulic control unit for an automatic transmission according to another exemplary aspect of the invention is provided with hydraulic servos, each of which engages and disengages respective friction engagement elements, hydraulic pressure supply means which supplies hydraulic pressure to a hydraulic servo of a predetermined friction engagement element selected according to a gearshift position to be achieved, failure detection means that detects that a failure has occurred in the hydraulic pressure supply means, and fail-safe means that prevents interlock from occurring due to a plurality of friction engagement elements engaging, prevents a neutral condition from being established and prevents a gearshift from a high-speed gear position to a low-speed gear position when the failure detection means detects that a failure has occurred.

In this case, when the failure detection means detects that a failure has occurred in a hydraulic pressure supply means, interlock occurring as a result of a plurality of friction engagement elements being engaged is prevented from occurring and a neutral condition is prevented from being established. A predetermined gearshift position on the high-speed position side is then achieved.

Accordingly, since gearshifting from a high-speed position to a low-speed position is prevented along with the prevention of the occurrence of interlock and the establishment of a neutral condition, a large engine braking being applied is prevented. As a result, the generation of gearshift shock is prevented.

In a further hydraulic control unit for an automatic transmission according to another exemplary aspect of the invention, the failure detection means is a failure detection valve that is provided with hydraulic pressure detection portions that detect that hydraulic pressures supplied to a plurality of hydraulic servos are generated simultaneously, and an output portion that generates a fail-safe pressure indicating that a failure has occurred when hydraulic pressures supplied to a plurality of hydraulic servos has been generated simultaneously, and outputs the fail-safe pressure to the fail-safe means.

In a still further hydraulic control unit for an automatic transmission according to another exemplary aspect of the invention, the failure detection means detects that hydraulic pressures supplied to each of the hydraulic servos for two clutches and one brake are generated simultaneously.

In a yet further hydraulic control unit for an automatic transmission according to another exemplary aspect of the invention, the fail-safe means is provided with a selector valve that, according to a selection, takes a first selector position at which a gear ratio of a sub-transmission is made larger and a second selector position at which the gear ratio of the sub-transmission is made smaller, and causes the selector valve to switch to the second selector position when the fail-safe pressure is supplied.

In a yet further hydraulic control unit for an automatic transmission according to another exemplary aspect of the invention, the selector valve allows a vehicle to drive in reverse when in the first selector position and prevents the vehicle from driving in reverse when in the second selector position.

In a yet further hydraulic control unit for an automatic transmission according to another exemplary aspect of the invention, the fail-safe means is provided with a first selector valve that, according to selection, supplies a hydraulic pressure to each of the hydraulic servos of the two clutches and supplies or exhausts a hydraulic pressure to or from the hydraulic servo of one brake, and a second selector valve that, according to the selection, takes a first selector position at which a gear ratio of a sub-transmission is made larger and a second selector position at which the gear ratio of the sub-transmission is made smaller, and causes the first selector valve to switch such that a hydraulic pressure is supplied to each of the hydraulic servos of the two clutches and the second selector valve to switch to the second position when the fail-safe pressure is supplied.

In a yet further hydraulic control unit for an automatic transmission according to another exemplary aspect of the invention, the second selector valve allows a vehicle to drive in reverse when in the first selector position and prevents the vehicle from driving in reverse when in the second selector position.

BRIEF DESCRIPTION OF THE DRAWINGS

Various embodiments of the invention will be described with reference to the following figures, wherein.

DETAILED DESCRIPTION OF PREFERRED EMBODIMENTS

The invention will hereinafter be described in detail with reference to the drawings.

Figure 2:
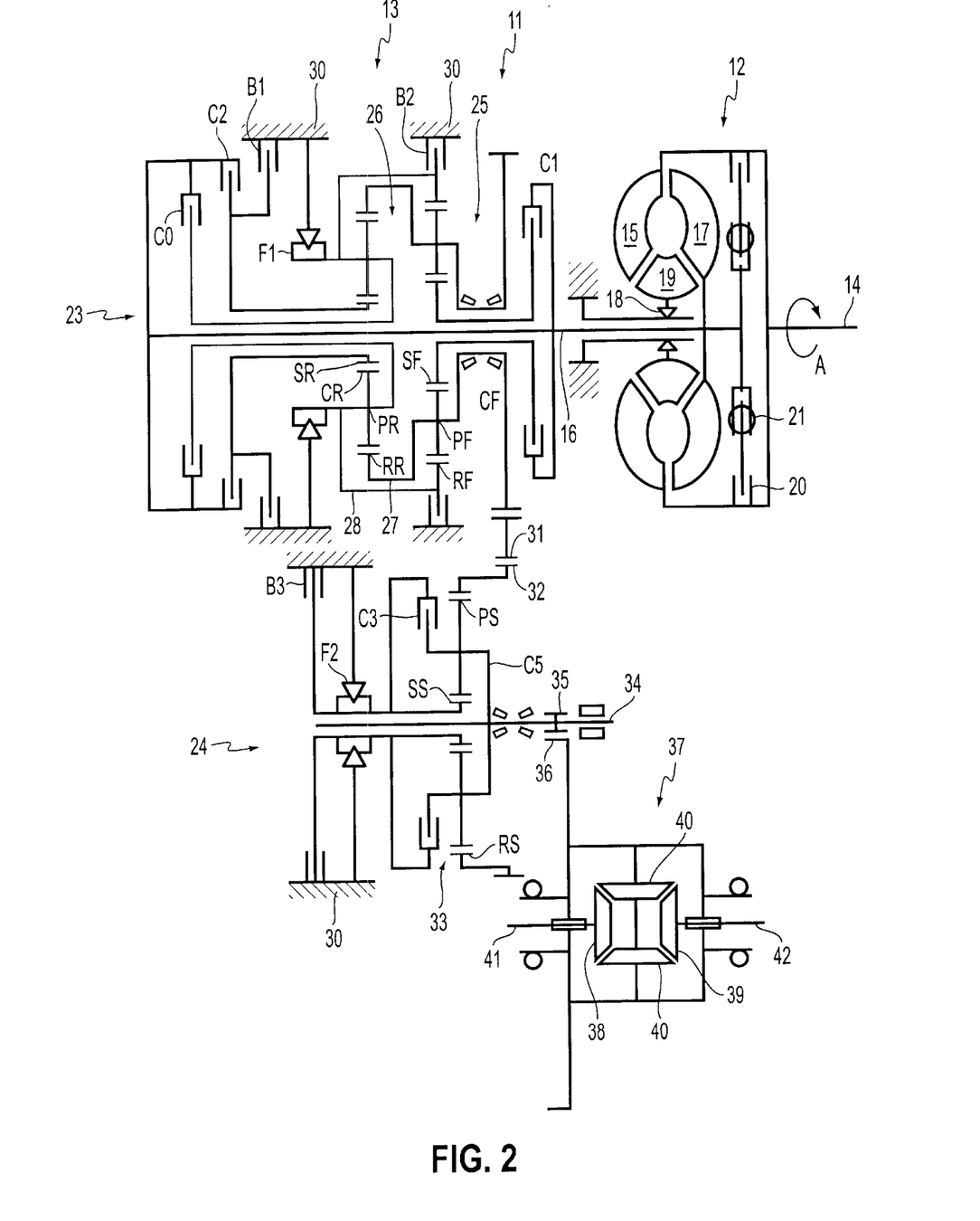
FIG. 2 is a conceptual drawing showing an automatic transmission according to an embodiment of the invention.
Figure 3:
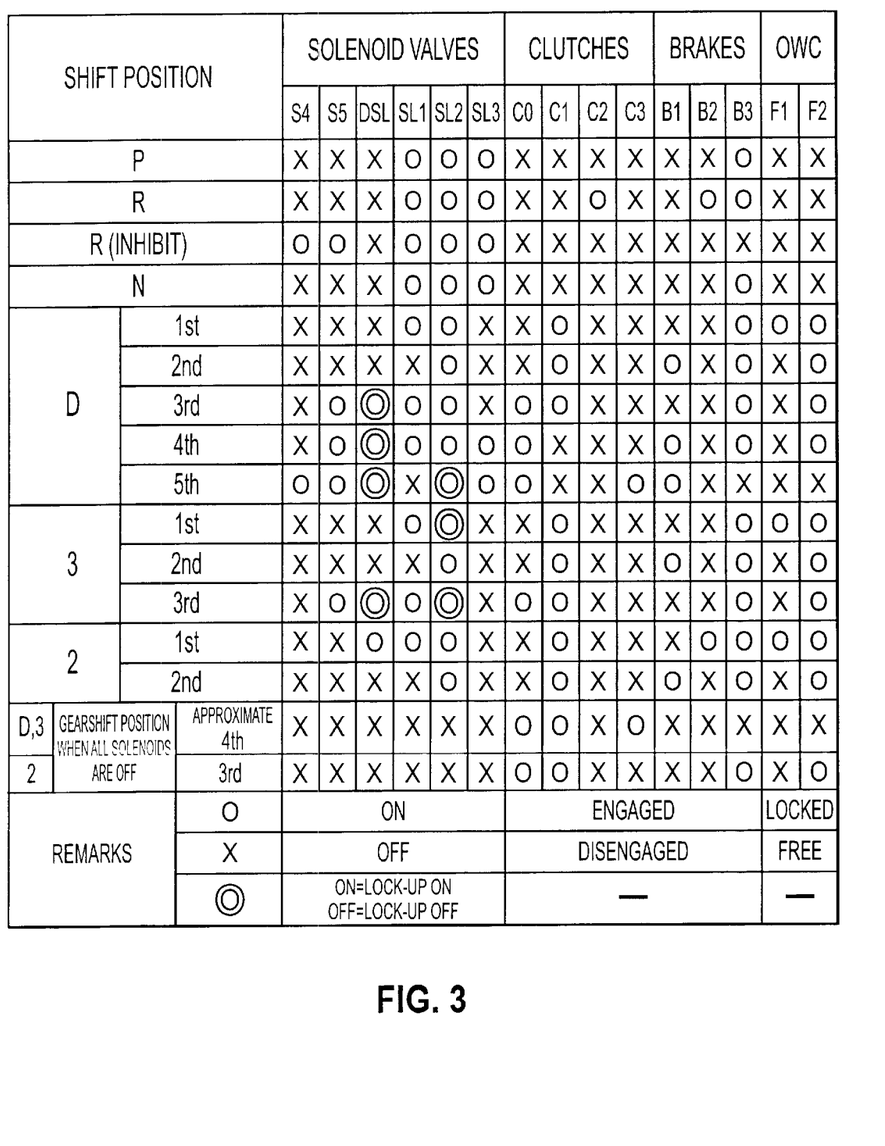
FIG. 3 is an operation table of the automatic transmission according to an embodiment of the invention.

FIG. 2 is a schematic drawing showing an automatic transmission according to an embodiment of the invention, and FIG. 3 is a table showing the operation of the automatic transmission according to the embodiment of the invention.

In FIG. 2, reference character 11 denotes an automatic transmission. The automatic transmission 11 is provided with, as gear elements, a front planetary gear unit 25, a rear planetary gear unit 26, and a planetary gear unit 33. As friction engagement elements, the automatic transmission has a first clutch C1, a second clutch C2, a third clutch C3, a fourth clutch C0, a first brake B1, a second brake B2, and a third brake B3. By engaging and disengaging predetermined friction engagement elements, a power drive transmitting condition is established in a transmission device 13.

Reference character 12 denotes a torque converter that transmits rotation in the direction of arrow A generated by the driving of an engine, not shown, to the automatic transmission 11. Reference character 13 denotes the transmission device that changes the speed of, and outputs, the rotation transmitted from the torque converter 12. The torque converter 12 comprises a pump impeller 15 coupled to an output shaft 14 to which engine rotation is output, a turbine runner 17 coupled to an input shaft 16 that inputs rotation to the transmission device 13, a stator 19 mounted on a one-way clutch 18, a lockup clutch 20 that locks to connect the output shaft 14 and the input shaft 16 when predetermined conditions are met, and a damper 21.

The transmission device 13 comprises a main transmission 23 and a sub-transmission 24. The main transmission 23 is provided with the front planetary gear unit 25 and the rear planetary gear unit 26. The front planetary gear unit 25 comprises a sun gear SF, a ring gear RF disposed concentrically with the sun gear SF, a pinion PF that is made to mesh with the sun gear SF and ring gear RF, and a carrier CF that rotatably supports the pinion PF. The rear planetary gear unit 26, on the other hand, comprises a sun gear SR, a ring gear RR disposed concentrically with the sun gear SR, a pinion PR that is made to mesh with the sun gear SR and ring gear RR, and a carrier CR that rotatably supports the pinion PR.

The carrier CF and the ring gear RR are coupled together by a coupling element 27 and the carrier CR and the ring gear RF are coupled together by a coupling element 28. The sun gear SF and the input shaft 16 are coupled together through the first clutch C1, the ring gear RF and an automatic transmission case 30 are selectively coupled together through the second brake B2 and a first one-way clutch F1 which are in juxtaposition with each other, and the carrier CF and a counter drive gear 31 are coupled together. Furthermore, the sun gear SR and the input shaft 16 are coupled together through the second clutch C2, the sun gear SR and the automatic transmission case 30 are coupled together through the first brake B1, the carrier CR and the input shaft 16 are coupled together through the fourth clutch C0, and the carrier CR and the automatic transmission case 30 are selectively coupled together through the second brake B2 and the first one-way clutch F1 which are in juxtaposition with each other.

Also, the sub-transmission 24 is provided with the planetary gear unit 33. The planetary gear unit 33 comprises a sun gear SS, a ring gear RS disposed concentrically with the sun gear SS, a pinion PS that is made to mesh with the sun gear SS and the ring gear RS, and a carrier CS that rotatably supports the pinion PS. The sun gear SS and the automatic transmission case 30 are selectively coupled together through the third brake B3 and a second one-way clutch F2 which are in juxtaposition with each other and the sun gear SS and the carrier CS are selectively coupled together through the third clutch C3. At the same time, the ring gear RS and a counter driven gear 32 are coupled together.

In addition, the counter drive gear 31 and the counter driven gear 32 are made to mesh with each other to allow rotation of the main transmission 23 to be transmitted to the sub-transmission 24. Also, the carrier CS and a counter shaft 34 are coupled together and an output gear 35 secured to the counter shaft 34 is made to mesh with a large ring gear 36 of a differential device 37. The differential device 37 is provided with left and right side gears 38, 39 and pinions 40 that are made to mesh with each of the side gears 38, 39, and transmits rotation transmitted through the large ring gear 36 proportionally to drive shafts 41, 42.

The first one-way clutch F1 is freed when an outer race, not shown, is secured to the automatic transmission case 30 and an inner race, not shown, tries to turn with the carrier CR in the same direction as the direction of arrow A (forward direction). The first one-way clutch F1 is locked when the inner race tries to turn in a direction opposite the direction of arrow A (reverse direction). The second one-way clutch F2 is locked when an outer race, not shown, is secured to the automatic transmission case 30 and an inner race, not shown, tries to turn with the sun gear SS in the forward direction, and freed when the inner race tries to turn in the reverse direction.

The operation of the automatic transmission 11 having the above-mentioned configuration will hereinafter be described.

In FIG. 3, reference characters SL1 to SL3 denote normally-open first to third solenoid valves, reference characters S4 and S5 denote normally-closed fourth and fifth solenoid valves, reference character DSL denotes a normally-closed sixth solenoid valve, reference character C1 denotes a first clutch, reference character C2 denotes a second clutch, reference character C3 denotes a third clutch, reference character C0 denotes a fourth clutch, reference character B1 denotes a first brake, reference character B2 denotes a second brake, reference character B3 denotes a third brake, reference character F1 denotes a first one-way clutch (OWC), and reference character F2 denotes a second one-way clutch.

In the shift position, reference character P denotes parking range; reference character R denotes reverse range; reference character N denotes neutral range; reference character D denotes forward range; reference character 3 denotes third range; reference character 2 denotes a second range; reference character 1st denotes a first speed; reference character 2nd denotes a second speed; reference character 3rd denotes a third speed; reference character 4th denotes a fourth speed; and reference character 5th denotes a fifth speed.

A mark "O" represents an ON condition for the first to the sixth solenoid valves SL1 to SL3, S4, S5, DSL, an engaged condition for the first clutch C1, second clutch C2, third clutch C3, fourth clutch C0, first brake B1, second brake B2, and the third brake B3, and a locked condition for the first and second one-way clutches F1, F2. A mark "X" represents an OFF condition for the first to the sixth solenoid valves SL1 to SL3, S4, S5, DSL, a disengaged condition for the first clutch C1, second clutch C2, third clutch C3, fourth clutch C0, first brake B1, second brake B2, and the third brake B3, and a freed condition for the first and second one-way clutches F1, F2. In addition, a mark "⊙" represents an ON condition when the lockup clutch 20 (FIG. 2) is engaged (lockup ON) and an OFF condition when the lockup clutch 20 is disengaged (lockup OFF).

In the first speed of the forward range, the first clutch C1 and the third brake B3 are engaged. In this case, in the main transmission 23, rotation of the engine (forward rotation) transmitted to the input shaft 16 is transmitted to the sun gear SF via the first clutch C1. Since the sun gear SF is made to mesh with the pinion PF, the sun gear SF tries to turn the carrier CF in the forward direction. However, the carrier CF, coupled to the drive shafts 41, 42 via the counter drive gear 31 and the sub-transmission 24, generates a reaction force. As a result, the ring gear RF tries to turn in the reverse direction. The reverse rotation is, however, impeded because the ring gear RF is coupled to the first one-way clutch F1 via the coupling element 28. Consequently, a decelerated rotation in the forward direction is output from the carrier CF and transmitted by way of the counter drive gear 31 to the sub-transmission 24.

In the sub-transmission 24, rotation of the counter drive gear 31 turns the counter driven gear 32 in the reverse direction, which turns the ring gear RS in the reverse direction. As the ring gear RS turns, the sun gear SS tries to turn in the forward direction. However, since the sun gear SS is coupled to the second one-way clutch F2, the sun gear SS is prevented from turning in the forward direction. As a result, the sub-transmission 24 is set in an underdrive condition and rotation of the first speed in the forward direction is output from the carrier CS and transmitted via the output gear 35 to the differential device 37.

In the second speed of the forward range, the first clutch C1 and the third brake B3 are engaged. In this case, in the main transmission 23, the sun gear SR is locked as the first brake B1 is engaged. As a result, a decelerated rotation is output from the carrier CF and transmitted by way of the counter drive gear 31 to the sub-transmission 24.

The sub-transmission 24 is then set in an underdrive condition and rotation of the second speed in the forward direction is output from the carrier CS and transmitted via the output gear 35 to the differential device 37.

Further, in the third speed of the forward range, the first clutch C1, the fourth clutch C0, and the third brake B3 are engaged. In this case, in the main transmission 23, the front planetary gear unit 25 and the rear planetary gear unit 26 are directly coupled together as the first clutch C1 and the fourth clutch C0 are engaged. As a result, rotation in the forward direction at the same speed as the engine is output from the carrier CF and transmitted by way of the counter drive gear 31 to the sub-transmission 24.

The sub-transmission 24 is then set in an underdrive condition and rotation of the third speed in the forward direction is output from the carrier CS and transmitted via the output gear 35 to the differential device 37.

Moreover, in the fourth speed of the forward range, the fourth clutch C0, the first brake B1, and the third brake B3 are engaged. In this case, the sun gear SR is locked and rotation in the forward direction at the same speed as the engine is transmitted to the carrier CR via the fourth clutch C0. As a result, an accelerated rotation is output from the ring gear RR and the carrier CF and transmitted by way of the counter drive gear 31 to the sub-transmission 24.

The sub-transmission 24 is then set in an underdrive condition and rotation of the fourth speed in the forward direction is output from the carrier CS and transmitted via the output gear 35 to the differential device 37.

Also, in the fifth speed of the forward range, the third clutch C3, the fourth clutch C0, and the first brake B1 are engaged. In this case, in the main transmission 23, the sun gear SR is locked and rotation in the forward direction at the same speed as the engine is transmitted to the carrier CR via the fourth clutch C0. As a result, an accelerated rotation is output from the ring gear RR and the carrier CF and transmitted by way of the counter drive gear 31 to the sub-transmission 24.

Then, as the third clutch C3 is engaged, the planetary gear unit 33 is directly coupled. Then, the sub-transmission 24 is also in a forward direction to be output from the carrier CS and transmitted via the output gear 35 to the differential device 37. In this embodiment, the sub-transmission 24 is switched from being directly coupled from an underdrive condition as the third clutch C3 is engaged, but the sub-transmission 24 may nonetheless be further switched from a state of being directly coupled through stepped-up speed to an overdrive condition as the third clutch C3 is engaged.

The hydraulic circuit will hereinafter be described.

Figure 1:
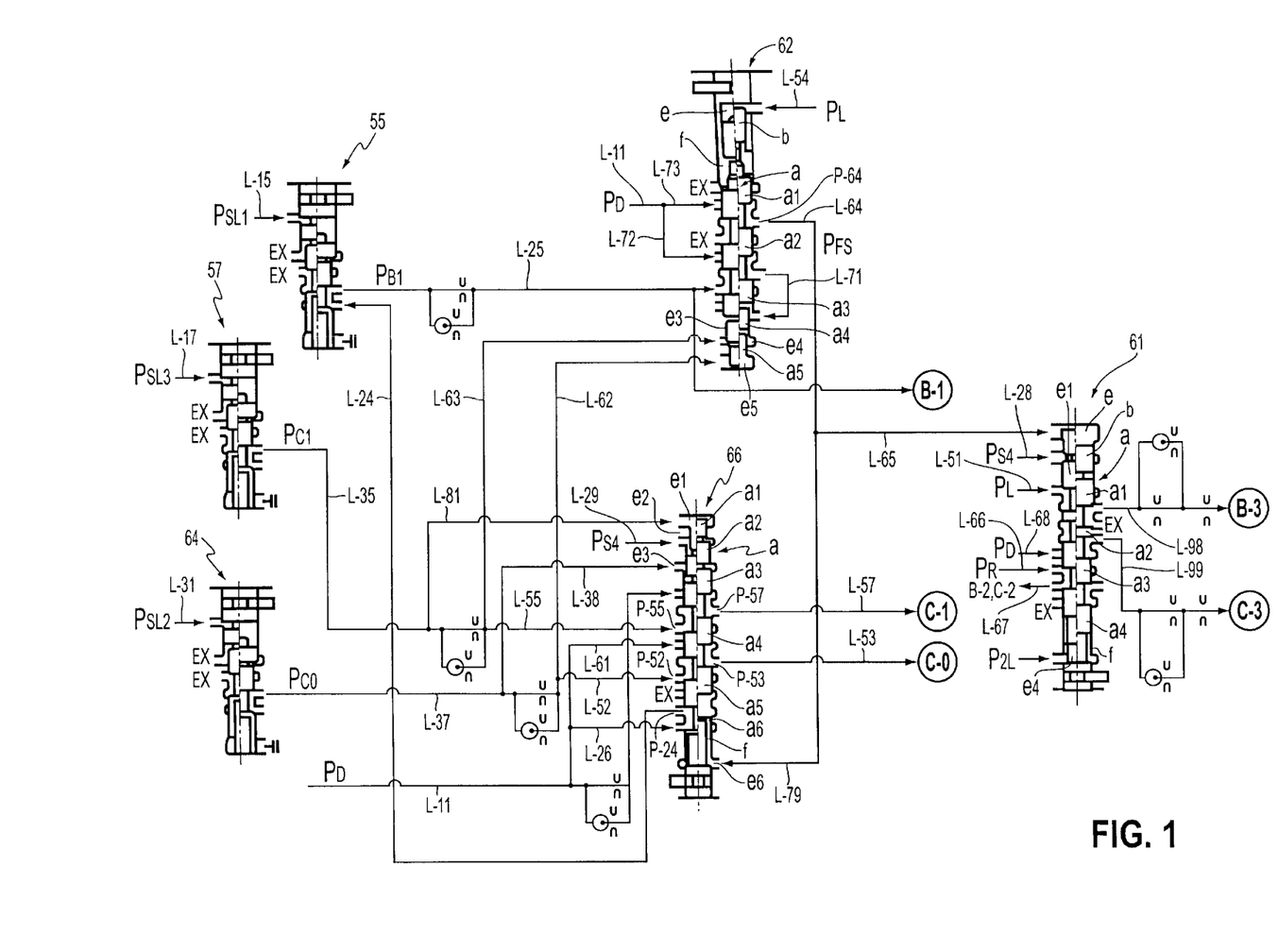
FIG. 1 shows the essential elements of a hydraulic circuit according to an embodiment of the invention.
Figure 4:
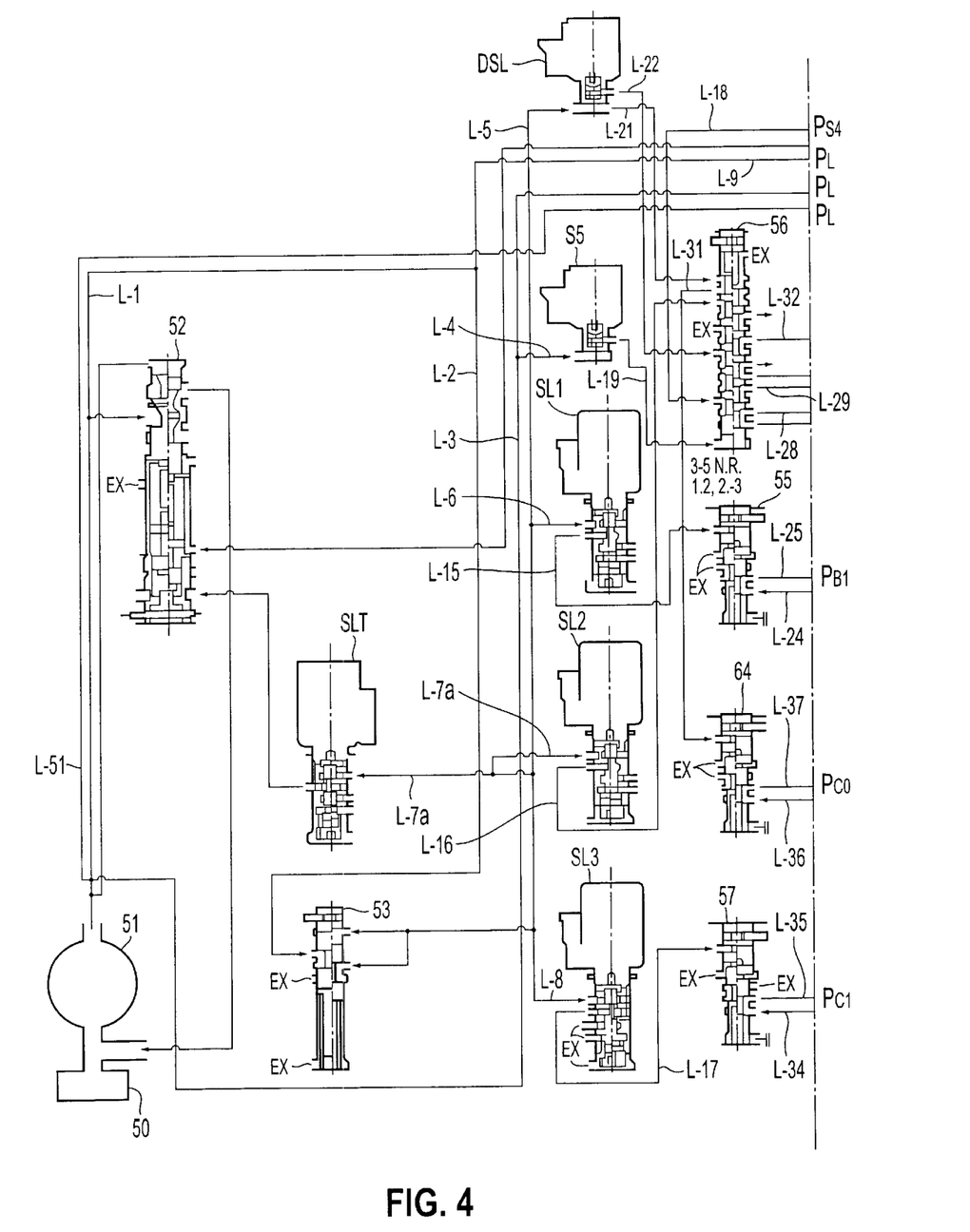
FIG. 4 shows the left-hand half of the hydraulic circuit according to an embodiment of the invention.
Figure 5:
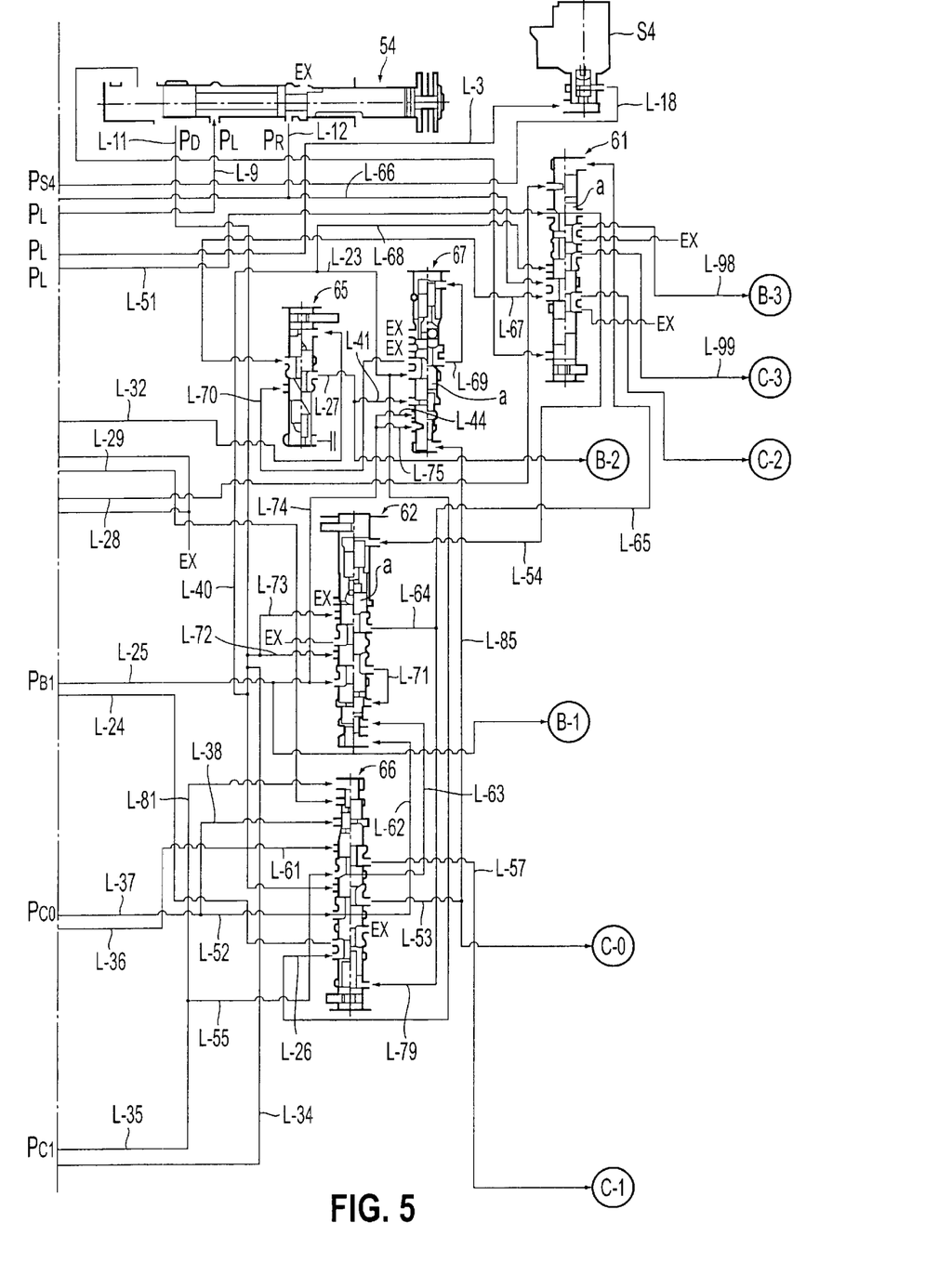
FIG. 5 shows the right-hand half of the hydraulic circuit according to an embodiment of the invention.

FIG. 1 shows an essential portion of a hydraulic circuit according to an embodiment of the invention. FIG. 4 shows a left-hand half of the hydraulic circuit according to an embodiment of the invention, while FIG. 5 shows a right-hand half of the hydraulic circuit according to an embodiment of the invention. FIGS. 1 and 4, and 1 and 5, are substantially equivalent to each other, though there are differences in the connection of oil passages.

In these drawings, C-1, C-2, C-3, C-0, B-1, B-2, and B-3 are hydraulic servos that engage and disengage a first clutch C0 (FIG. 2), a second clutch C2, a third clutch C3, a fourth clutch C0, a first brake B1, a second brake B2, and a third brake B3, respectively, as a hydraulic pressure is supplied to, or exhausted from, it. When a gearshift position is selected by transmission means of a control unit, not shown, a predetermined hydraulic servo corresponding to the gearshift position is selected from among hydraulic servos C-1, C-2, C-3, C-0, B-1, B-2, and B-3, and a predetermined hydraulic pressure for application is supplied to the selected hydraulic servo.

Reference character 50 denotes a strainer, reference character 51 denotes an oil pump that sucks in and discharges oil in an oil tank, not shown, through the strainer 50, and reference character 52 denotes a primary regulator. The primary regulator 52 controls the hydraulic pressure in an oil passage L-1 to generate a predetermined line pressure $P_L$. The line pressure $P_L$ is supplied to a solenoid modulator valve 53 by way of an oil passage L-2 and the solenoid modulator valve 53 controls the line pressure $P_L$ to generate a solenoid modulator pressure.

Then, the line pressure $P_L$ generated by the primary regulator valve 52 is supplied through oil passages L-1 and L-3 to a fourth solenoid valve S4 and through oil passages L-1, L-3, and L-4 to a fifth solenoid valve S5. The solenoid modulator pressure generated by the solenoid modulator valve 53 is, on the other hand, supplied through an oil passage L-5 to a sixth solenoid valve DSL, through an oil passage L-6 to a first solenoid valve SL1, through an oil passage L-7 to a second solenoid valve SL2, through an oil passage L-8 to a third solenoid valve SL3, and through an oil passage L-7a to a seventh solenoid valve SLT.

The first to third solenoid valves SL1 to SL3 and seventh solenoid valve SLT are normally-open type solenoid valves, which means that a signal hydraulic pressure is not generated when each of these solenoids is ON (energized) and, a signal hydraulic pressure is generated when each of these solenoids is OFF (deenergized). The fourth to sixth solenoid valves S4, S5, and DSL are normally-closed type solenoid valves which means that a signal hydraulic pressure is generated when each of these solenoids is ON and, a signal hydraulic pressure is not generated when each of these solenoids is OFF.

Furthermore, the line pressure $P_L$ is supplied through oil passages L-1 and L-9 to a manual valve 54 which is hydraulic pressure selection generation means. The manual valve 54 is operated when a shift lever, switch, or other speed selection device, not shown, is operated. When a forward range is selected, the manual value 54 operates to generate a D range pressure $P_D$ in an oil passage L-11 and, when a reverse range is selected, it operates to generate an R range pressure $P_R$ in an oil passage L-12.

The first solenoid valve SL1 receives a first solenoid signal SG1 from the control unit, controls the solenoid modulator pressure supplied from the solenoid modulator valve 53 to generate a signal hydraulic pressure $P_{SL1}$, and then supplies the signal hydraulic pressure $P_{SL1}$ through an oil passage L-15 to a B-1 control valve 55. Also, the second solenoid valve SL2 receives a second solenoid signal SG2 from the control unit, controls the solenoid modulator pressure supplied from the solenoid modulator valve 53 to generate a signal hydraulic pressure $P_{SL2}$, and then supplies the signal hydraulic pressure $P_{SL2}$ through an oil passage L-16 to a solenoid relay valve 56. Then, the third solenoid valve SL3 receives a third solenoid signal SG3 from the control unit, controls the solenoid modulator pressure supplied from the solenoid modulator valve 53 to generate a signal hydraulic pressure $P_{SL3}$, and then supplies the signal hydraulic pressure $P_{SL3}$ through an oil passage L-17 to a C-1 control valve 57.

The fourth solenoid valve S4, as it receives a fourth solenoid signal SG4 from the control unit, turns the solenoid ON and OFF. When the solenoid is ON, a signal hydraulic pressure $P_{S4}$ is generated and is supplied through an oil passage L-18 to the solenoid relay valve 56. The fifth solenoid valve S5, as it receives a fifth solenoid signal SG5 from the control unit, turns the solenoid ON or OFF. When the solenoid is ON, a signal hydraulic pressure $P_{S5}$ is generated and is supplied through an oil passage L-19 to the solenoid relay valve 56. Further, the sixth solenoid valve DSL, as it receives a sixth solenoid signal SG6 from the control unit, controls the solenoid modulator pressure supplied from the solenoid modulator valve 53 and generates a signal hydraulic pressure $P_{DSL}$ to supply the solenoid modulation pressure through an oil passage L-22 to the solenoid relay valve 56.

The solenoid relay valve 56 is switched according to the signal hydraulic pressure $P_{S5}$ supplied via the oil passage L-19 and takes a left-hand half position at a third speed or higher to provide communication between oil passages L-21 and L-31, and between oil passages L-18 and L-28, and thereby supplies the solenoid modulator pressure supplied through oil passages L-5 and L-21 to a C-0 control valve 64 through the oil passage L-31, as well as supplies the signal hydraulic pressure $P_{S4}$ supplied through oil passages L-3 and L-18 to gear ratio selection means and a 4-5 shift valve 61 which functions as a second selector valve through an oil passage L-28, respectively. In addition, the solenoid relay valve 56 takes a right-hand half position at a second speed or lower and during 2-3 gearshifting to provide communication between oil passages L-16 and L-31, between oil passages L-22 and L-32, and between oil passages L-18 and L-29. The solenoid relay valve 56 thereby supplies the signal hydraulic pressure $P_{SL2}$, supplied through an oil passage L-16, to the C-0 control valve 64 through the oil passage L-31. The solenoid relay valve 56 also supplies the signal hydraulic pressure $P_{DSL}$, supplied through the oil passage L-22, to a B-2 control valve 65 through an oil passage L-32. At the same time, the solenoid relay valve 56 supplies the signal hydraulic pressure $P_{S4}$, supplied through the oil passage L-18, to interlock prevention means, neutral condition establishment prevention means, and a clutch application control valve 66, which functions as a first selector valve through the oil passage L-29.

The second and sixth solenoid valves SL2, DSL are used to provide lockup control for the torque converter 12 at a third speed or higher. When the solenoid relay valve 56 takes the left-hand half position at a third speed or higher, the signal hydraulic pressure $P_{SL2}$, supplied through the oil passage L-16, is supplied to a lockup control valve, not shown, and the signal hydraulic pressure $P_{DSL}$, supplied through the oil passage L-22, is supplied to a lockup relay valve, not shown.

First hydraulic pressure supply means is made up of at least one among the first solenoid valve SL1 and the B-1 control valve 55. Second hydraulic pressure supply means is made up of at least one among the second solenoid valve SL2, solenoid relay valve 56, and the C-0 control valve 64. Third hydraulic pressure supply means is made up of at least one among the third solenoid valve SL3 and the C-1 control valve 57. Further, the B-1 control valve 55, C-1 control valve 57, and the C-0 control valve 64 make up a control valve.

Being supplied with the signal hydraulic pressure $P_{SL1}$ through the oil passage L-15, the B-1 control valve 55 controls the D range pressure $P_D$ supplied through oil passages L-11, L-40, L-23, and L-26, the clutch application control valve 66, and the oil passage L-24, generates the B-1 control pressure $P_{B1}$, and supplies the B-1 control pressure $P_{B1}$ through the oil passage L-25 to the B-1 application control valve 62 functioning as failure detection mean and a failure detection valve. The 4-5 shift valve 61 and the clutch application control valve 66 make up fail-safe means.

Moreover, being supplied with the signal hydraulic pressure $P_{SL3}$ through the oil passage L-17, the C-1 control valve 57 controls the D range pressure $P_D$ supplied through oil passages L-11 and L-34, generates a C-1 control pressure $P_{C1}$, and supplies the C-1 control pressure $P_{C1}$ to the clutch application control valve 66 through oil passages L-35 and L-81 and oil passages L-35 and L-55. At the same time, the C-1 control valve supplies the C-1 control pressure $P_{C1}$ to the B-1 application control valve 62 through oil passages L-35 and L-63. Then, being supplied with the signal hydraulic pressure $P_{SL2}$ through the oil passage L-31, the C-0 control valve 64 controls the D range pressure $P_D$ supplied through oil passages L-11 and L-36, generates the C-1 control pressure $P_{C0}$, and supplies the C-0control pressure $P_{C0}$ to the clutch application control valve 66 through oil passages L-37 and L-38 and oil passages L-37 and L-52. At the same time, C-0 control valve 64 supplies the C-0 control pressure $P_{C0}$ to the B-1 application control valve 62 through oil passages L-37 and L-62 (also through an oil passage L-52 for convenience sake in FIG. 5). The C-1 control pressure $P_{C1}$ forms a first control hydraulic pressure, the C-1 control pressure $P_{C0}$ forms a second control hydraulic pressure, and the B-1 control pressure $P_{B1}$ forms a third control pressure.

Further, being supplied with the signal hydraulic pressure $P_{DSL}$ through the oil passage L-32, the B-2 control valve 65 controls the D range pressure $P_D$ supplied through oil passages L-11, L-40, B-2 application control valve 67, and an oil passage L-70, generates the B-2 control pressure $P_{B2}$, and supplies the B-2 control pressure $P_{B2}$ to the B-2 application control valve 67 through oil passages L-27 and L-41. The B-1 application control valve 62, clutch application control valve 66, and B-2 application control valve 67 comprise selector valves.

Also, the clutch application control valve 66 selectively takes the left-hand half position as a first selector position and the right-hand half position as a second selector position. The clutch application control valve 66 is placed into the left-hand half position by the C-0 control pressure $P_{C0}$, supplied through oil passages L-37 and L-38, and supplies the C-0 control pressure $P_{C0}$, supplied through oil passages L-37 and L-52, to the hydraulic servo C-0 through an oil passage L-53. Further, the clutch application control valve 66 is placed into the left-hand half position by the C-1 control pressure $P_{C1}$, supplied through oil passages L-35 and L-81, and supplies the C-1 control pressure $P_{C1}$ supplied through oil passages L-35 and L-55 to the hydraulic servo C-1 through an oil passage L-57.

Also, another hydraulic pressure, a D range pressure $P_D$, is supplied to the clutch application control valve 66 through the oil passage L-11, through oil passages L-11 and L-61, or through oil passages L-11, L-40, L-23, and L-26. When the C-0 control pressure $P_{C0}$ or C-1 control pressure $P_{C1}$ and the signal hydraulic pressure $P_{S4}$ are not supplied to the clutch application control valve 66, a spring force of a spring f as counteraction means causes the clutch application control valve 66 to take the right-hand half position, thus providing communication between oil passages L-11 and L-53, and between oil passages L-61 and L-57. This results in the D range pressure $P_D$ being supplied to hydraulic servos C-1 and C-0, which results, in turn, in the communication between oil passages L-26 and L-24 being shut off. When the clutch application control valve 66 takes the left-hand half position, the communication between oil passages L-11 and L-53, and between L-61 and L-57 is shut off.

Next, the B-1 application control valve 62 selectively takes the left-hand half position as a first selector position and the right-hand half position as a second selector position to supply and exhaust the C-1 control pressure $P_{C1}$ and C-0 control pressure $P_{C0}$ to and from the hydraulic servo C-1 and C-0, and to supply and exhaust the B-1 control pressure $P_{B1}$ to and from the hydraulic servo B-1. The B-1 application control valve 62 takes the left-hand half position when the line pressure $P_L$ is supplied through oil passages L-1 and L-51, and L-54, and, at the left-hand half position, receives through the oil passage L-71 the B-1 control pressure $P_{B1}$ supplied through the oil passage L-25. The B-1 application control valve 62 takes the right-hand half position when the C-0 control pressure $P_{C0}$ is supplied through oil passages L-37 and L-62, and the C-1 control pressure $P_{C1}$ is supplied through oil passages L-35 and L-63, and, at the right-hand half position, receives through the oil passage L-71, the D range pressure $P_D$ supplied through oil passages L-11 and L-72 and supplies as a fail-safe pressure (signal hydraulic pressure) $P_{FS}$ the D range pressure $P_D$ supplied through oil passages L-11 and L-73 to the 4-5 shift valve 61 through oil passages L-64 and L-65.

The B-1 control pressure $P_{B1}$, C-0 control pressure $P_{C0}$, and C-1 control pressure $P_{C1}$ act on the B-1 application control valve 62 to move a spool a upward, that is, to make the B-1 application control valve 62 take the right-hand half position. When these three hydraulic pressures, that is, the B-1 control pressure $P_{B1}$, C-0 control pressure $P_{C0}$, and C-1 control pressure $P_{C1}$, are supplied and when the sum of all these pressures becomes a predetermined level or higher, the oil passage L-73 is brought into fluid communication with the oil passage L-64. This supplies the D range pressure $P_D$ as the fail-safe pressure $P_{FS}$ to the clutch application control valve 66 through the oil passage L-79.

The 4-5 shift valve 61, supplied with the signal hydraulic pressure $P_{S4}$ through the oil passage L-28 and the fail-safe pressure $P_{FS}$ through the oil passage L-65, takes the left-hand half position as a first selector position at the first to the fourth speed and the right-hand half position as a second selector position at the fifth speed. The 4-5 shift valve at the left-hand half position supplies the line pressure $P_L$ supplied through oil passages L-1 and L-51 to the B-1 application control valve 62 through the oil passage L-54 and to the hydraulic servo B-3 through the oil passage L-98. At the same time, the 4-5 shift valve supplies the R range pressure $P_R$ supplied through oil passages L-12 and L-66 to the B-2 control valve 65 through the oil passage L-67 to permit driving in reverse. Also, at the right-hand half position, the 4-5 shift valve supplies the D range pressure $P_D$ supplied through oil passages L-11, L-40, and L-68 to the hydraulic servo C-3 through the oil passage L-99 to inhibit driving in reverse. The signal hydraulic pressure $P_{S4}$, supplied to the 4-5 shift valve 61, is generated by a fourth solenoid valve S4 and supplied through the oil passage L-18, solenoid relay valve 56, and the oil passage L-28 to place the spool a at the right-hand half position and a spool b at the left-hand half position. The fail-safe pressure $P_{FS}$ supplied to the 4-5 shift valve, on the other hand, is generated by the B-1 application control valve 62 and supplied through oil passages L-64 and L-65 to place spools a and b at the right-hand half position.

Next, the B-2 application control valve 67, supplied with the D range pressure $P_D$ through oil passages L-11, L-40, L-23, and L-69, takes the left-hand half position and supplies the D range pressure $P_D$ supplied through oil passages L-11, L-40, and L-23 to the B-2 control valve 65 through the oil passage L-70. The B-2 application control valve 67 is supplied with the B-2 control pressure $P_{B2}$ through the oil passage L-41, the hydraulic pressure supplied to the hydraulic servo C-0 through the oil passage L-85, and the B-1 control pressure $P_{B1}$ through oil passages L-25, L-74, L-44, and L-45, and these pressures act on the B-2 application control valve to move the spool a upward, that is, to make the B-2 application control valve 67 take the right-hand half position. When any two of these three pressures, that is, the B-2 control pressure $P_{B2}$, the hydraulic pressure supplied to the hydraulic servo C-0, and the B-1 control pressure $P_{B1}$, are supplied and when the sum of the two hydraulic pressures becomes a predetermined level or higher, the B-2 application control valve 67 takes the right-hand half position. This shuts off the communication between oil passages L-23 and L-70 and brings the oil passage L-70 into fluid communication with a drain port.

Referring next to the hydraulic circuits shown in FIGS. 1, 4, and 5 and the operation table shown in FIG. 3, the operation of the hydraulic circuits in each of the different gearshift positions will be described.

In the first speed of all ranges but the second, the line pressure $P_L$ controlled by the primary regulator valve 52 is supplied to the 4-5 shift valve 61 through oil passages L-1 and L-51. Not being supplied with the signal hydraulic pressure $P_{S4}$ from the fourth solenoid valve S4, the 4-5 shift valve 61 takes the left-hand half position. This provides communication between oil passages L-51 and L-98, thus allowing the line pressure $P_L$ to be supplied to the hydraulic servo B-3, which engages the third brake B3.

Further, the solenoid of the first solenoid valve SL1 is turned ON to shut off the oil passage across L-6 and L-15. As a result, the signal hydraulic pressure $P_{SL1}$ is not generated in the oil passage L-15 and therefore is not supplied to the B-1 control valve 55. This results, in turn, in the communication between oil passages L-24 and L-25 being shut off, which generates no B-1 control pressure $P_{B1}$ in the oil passage L-25.

Likewise, the solenoid of the second solenoid valve SL2 is also turned ON to shut off the communication between oil passages L-7 and L-16.

Then, the solenoid of the fifth solenoid valve S5 is turned OFF to allow the solenoid relay valve 56 to take the right-hand half position. Then, the signal hydraulic pressure $P_{SL2}$ is not generated in the oil passage L-16 and is not supplied to the C-0 control valve 64 even though there is communication between oil passages L-16 and L-31. Then, the communication between oil passages L-36 and L-37 is shut off and the C-0 control pressure $P_{C0}$ is not generated in the oil passage L-37.

Also, the third solenoid valve SL3 uses, as a source pressure, the solenoid modulator pressure supplied from the solenoid modulator valve 53 through the oil passage L-8 to generate in the oil passage L-17 a predetermined signal hydraulic pressure $P_{SL3}$ corresponding to the third solenoid signal SG3 sent from the control unit. When the signal hydraulic pressure $P_{SL3}$ generated in the oil passage L-17 is sent to the C-1 control valve 57, the C-1 control valve 57 controls the D range pressure $P_D$ supplied through oil passages L-11 and L-34 to generate the C-1 control pressure $P_{C1}$. The C-1 control valve 57 then supplies the C-1 control pressure $P_{C1}$ to the clutch application control valve 66 through oil passages L-35 and L-81 or through oil passages L-35 and L-55.

The C-1 control pressure $P_{C1}$ is supplied to the hydraulic servo C-1 through the oil passage L-57 to engage the first clutch C1. At this time, the C-1 control pressure $P_{C1}$ is supplied to the B-1 application control valve 62 through oil passages L-35 and L-63, thus causing the B-1 application control valve 62 to take the left-hand half position.

Next, the solenoid of the sixth solenoid valve DSL is turned OFF to shut off the communication between oil passages L-5 and L-22. As a result, no signal hydraulic pressure C-1 $P_{DSL}$ is generated in the oil passage L-22. Then, the solenoid of the fifth solenoid valve S5 is turned OFF, causing the solenoid relay valve 56 to take the right-hand half position such that the signal hydraulic pressure $P_{DSL}$ is not supplied to the B-2 control valve 65 even though there is communication between oil passages L-22 and L-32, and the B-2 control valve 65 takes the left-hand half position. Therefore, the communication between oil passages L-70 and L-27 is shut off and the B-2 control pressure $P_{B2}$ is not generated in the oil passage L-41.

In this way, the first clutch C1 and the third brake B3 are engaged with each other and the first one-way clutch F1 is locked to achieve the first speed.

Further, with the first speed of the second range, the second brake B2 must be engaged to apply engine brake. Here, the sixth solenoid valve DSL uses, as a source pressure, the solenoid modulator pressure supplied through the oil passage L-5 to generate in the oil passage L-22 a signal hydraulic pressure $P_{DSL}$ corresponding to the sixth solenoid signal SG6 sent from the control unit.

Then, the solenoid of the fifth solenoid valve S5 is turned OFF to allow the solenoid relay valve 56 to take the right-hand half position. This provides communication between the oil passages L-22 and L-32 and the signal hydraulic pressure $P_{DSL}$ supplied from the sixth solenoid valve DSL is supplied to the B-2 control valve 65 through the oil passage L-32. The B-2 control valve 65 controls the degree of communication between the oil passages L-70 and L-27 according to the signal hydraulic pressure $P_{DSL}$ supplied from the sixth solenoid valve DSL and generates the B-2 control pressure $P_{B2}$ in the oil passage L-27. The B-2 control pressure $P_{B2}$ is supplied to the hydraulic servo B-2 of the second brake B2 through the oil passage L-27, thus engaging the second brake B2. As a result, engine braking of the first speed can be applied. When the second range is selected, a 2 range pressure $P_{2L}$ is supplied to the 4-5 shift valve 61, and the 4-5 shift valve 61 takes the left-hand half position.

Next, the hydraulic circuit of the second speed will be described.

The second speed is achieved by engaging the first brake B1 in addition to the conditions noted for the first speed of all ranges but the second. The first solenoid signal SG1 is output from the control unit to the first solenoid valve SL1, which is energized in the first speed, and the solenoid modulator pressure supplied through the oil passage L-6 is used as the source pressure to generate a signal hydraulic pressure $P_{SL1}$ corresponding to the first solenoid signal SG1 in the oil passage L-15. In the first speed, the communication between oil passages L-24 and L-25 is shut off and the oil passage L-25 is in communication with the drain port. In the second speed, however, the degree of communication between the oil passages L-24 and L-25 is controlled according to the first solenoid signal SG1 fed from the control unit based on the signal hydraulic pressure $P_{SL1}$ supplied through the oil passage L-15. As a result, the B-1 control pressure $P_{B1}$ is generated at the B-1 control valve 55 and is supplied through the oil passage L-25 to the hydraulic servo B-1.

Next, the hydraulic circuit of the third speed will hereinafter be described.

The third speed is achieved by engaging the fourth clutch C0 and disengaging the first brake B1, in addition to the conditions noted for the second speed. That is, the third speed is achieved by engaging the first clutch C1, the fourth clutch C0, and the third brake B3. When the solenoid of the first solenoid valve SL1 is turned OFF in accordance with the first solenoid signal SG1 from the control unit, the oil passage L-25 is brought into communication with the drain port, thus draining the hydraulic pressure from the hydraulic servo B-1 of the first brake B1 which is engaged in the second-speed condition.

Moreover, the second solenoid valve SL2 uses as the source pressure the solenoid modulator pressure supplied through the oil passage L-7 to generate a predetermined signal hydraulic pressure $P_{SL2}$ in the oil passage L-16 based on the second solenoid signal SG2 fed from the control unit. Then this signal hydraulic pressure $P_{SL2}$ is supplied to the solenoid relay valve 56 through the oil passage L-16.

While the solenoid relay valve 56 takes the left-hand half position with the third speed or higher, it maintains the right-hand half position during the period until the third speed is achieved, that is, during 2-3 gearshifting. During 2-3 gearshifting, therefore, the oil passage L-16 is connected to the oil passage L-31 through the solenoid relay valve 56 and the signal hydraulic pressure $P_{SL2}$ is supplied to the C-0 control valve 64 through the oil passage L-16, the solenoid relay valve 56, and the oil passage L-31. As a result, the D range pressure $P_D$ supplied through oil passages L-11 and L-36 is controlled to become the C-1 control pressure $P_{C0}$, supplied to the clutch application control valve 66 through oil passages L-37 and L-38 and oil passages L-37 and L-52. The C-0 control pressure $P_{C0}$ supplied to the clutch application control valve 66 through oil passages L-37 and L-52 makes the clutch application control valve 66 take the left-hand half position.

Then, the C-0 control pressure $P_{C0}$ supplied to the clutch application control valve 66 is supplied to the hydraulic servo C-0 of the fourth clutch C0 through the oil passage L-53 to engage the fourth clutch C0. At the same time, the C-0 control pressure $P_{C0}$ supplied to the B-1 application control valve 62 makes the B-1 application control valve 62 take the right-hand half position. In addition, the engagement pressure of the hydraulic servo C-0 is supplied to the B-2 application control valve 67 through the oil passage L-85, making the B-2 application control valve 67 select the left-hand half position.

When gearshifting to the third speed is completed, the solenoid of the fifth solenoid valve S5 is turned ON by the fifth solenoid signal from the control unit and the line pressure $P_L$ from oil passages L-1 and L-4 is used as the source pressure to generate the signal hydraulic pressure $P_{S5}$ in the oil passage L-19. This causes the solenoid relay valve 56 to take the left-hand half position, allowing the second and sixth solenoid valves SL2 and DSL to control the lockup control valves, not shown.

Also, the solenoid relay valve 56 taking the left-hand half position causes the solenoid modulator pressure supplied from the solenoid modulator valve 53 to be supplied to the C-0 control valve 64 through the oil passages L-5, L-21, the solenoid relay valve 56, and the oil passage L-31, thus maintaining fluid communication between oil passages L-36 and L-37. This maintains the fourth clutch C0 in the engaged position at a gearshift position of the third speed or higher. Further, since the oil passage L-32, through which the signal hydraulic pressure $P_{DSL}$ for the control of the B-2 control valve 65 is supplied, is connected to the drain port by the solenoid relay valve 56 taking the left-hand half position, the B-2 control valve 65 maintains the left-hand half position, thus shutting off the communication between oil passages L-70 and L-27.

Next, the hydraulic circuit of the fourth speed will be described.

The fourth speed is achieved by engaging the first brake B1 and disengaging the first clutch C1, in addition to the conditions noted for the third speed. That is, the fourth speed is achieved by engaging the fourth clutch C0, the first brake B1, and the third brake B3. The hydraulic pressure in the hydraulic servo C-1 of the first clutch C1 engaged in the third speed is drained through the oil passage L-57, clutch application control valve 66, oil passages L-55 and L-35, and the C-1 control valve 57 when the solenoid of the third solenoid valve SL3 is turned ON by the third solenoid signal SG3 from the control unit. The first clutch C1 in this manner is disengaged.

Also, the first solenoid valve SL1 uses, as the source pressure, the solenoid modulator pressure supplied through the oil passage L-6 to generate a signal hydraulic pressure $P_{SL1}$ in the oil passage L-15 based on the first solenoid signal SG1 fed from the control unit. The signal hydraulic pressure $P_{SL1}$ is supplied to the B-1 control valve 55 through the oil passage L-15. The B-1 control valve 55 uses, as a source pressure, the D range pressure $P_D$ supplied through the oil passage L-24 to generate the B-1 control pressure $P_{B1}$ in the oil passage L-25. The B-1 control pressure $P_{B1}$ is supplied to the hydraulic servo B-1 of the first brake B1 through the oil passage L-25. The first brake B1 in this manner is engaged.

Next, the hydraulic circuit of the fifth speed will be described.

The fifth speed is achieved by engaging the third clutch C3 and disengaging the third brake B3, in addition to the conditions noted for the fourth speed. That is, the fifth speed is achieved by engaging the third clutch C3, the fourth clutch C0, and the first brake B1. When the solenoid of the fourth solenoid valve S4 is turned ON by the fourth solenoid signal SG4 fed from the control unit, the signal hydraulic pressure $P_{S4}$ is supplied to the 4-5 shift valve 61 and the 4-5 shift valve 61, which has taken the left-hand half position, is switched to the right-hand half position. This shuts off the communication between oil passages L-51 and L-98 and the oil passage L-98 is brought into fluid communication with the drain port through the 4-5 shift valve 61, thus draining the hydraulic pressure from the hydraulic servo B-3. The third brake B3 in this manner is released.

Further, the oil passage L-99, which has been in communication with the drain port through the 4-5 shift valve 61, is brought into communication with the oil passage L-68 when the 4-5 shift valve 61 takes the right-hand half position. This results in the D range pressure $P_D$ being supplied to the hydraulic servo C-3 of the third clutch C3 through oil passages L-11, L-40, L-68, and L-99. The third clutch C3 can, in this manner, be engaged.

Also, when the reverse range is selected, the fifth solenoid valve S5 is turned OFF, the solenoid relay valve 56 takes the right-hand half position, the oil passage L-28 is brought into communication with the drain port through the solenoid relay valve 56, and the signal hydraulic pressure $P_{S4}$ is not supplied to a signal hydraulic chamber e1 of the 4-5 shift valve 61, to let the 4-5 shift valve 61 take the left-hand half position. Consequently, the R range pressure $P_R$ supplied from the manual valve 54 is supplied to the hydraulic servo C-2 through the oil passage L-66 and the 4-5 shift valve 61, thereby engaging the second clutch C2. Also, the line pressure $P_L$ is supplied to the hydraulic servo B-3 through the oil passage L-51, the 4-5 shift valve 61, and the oil passage L-98, to engage the third brake B3. Further, the R range pressure $P_R$ supplied from the manual valve 54 is supplied to the hydraulic servo B-2 through the oil passage L-66, the 4-5 shift valve 61, the oil passage L-67, the B-2 control valve 65, and the oil passage L-27, thereby engaging the second brake B2. As a result, the vehicle can be reversed.

Since the R range pressure $P_R$ is supplied to the hydraulic servos C-2 and B-2, which are disposed to be for reversing, through the 4-5 shift valve 61, the 4-5 shift valve 61 may be switched to the right-hand half position depending on the vehicle driving condition to inhibit driving in reverse (achievement of the reverse position).

To achieve a given gearshift position in the automatic transmission 11 of the above-mentioned configuration, one or more predetermined friction engagement elements are designed to be engaged. If, however, a failure occurs in a solenoid valve, such as the first to the third solenoid valves SL1 to SL3, allowing a friction engagement element which is not supposed to be engaged to be engaged, there is a chance of interlock occurring in the transmission device 13.

For example, in the forward range, the first clutch C1 and the first brake B1 are engaged at the same time in the second speed, the first clutch C1 and the fourth clutch C0 are engaged at the same time in the third speed, and the fourth clutch C0 and the first brake B1 are engaged at the same time in the fourth and fifth speeds. If a failure occurs in the solenoid valves, resulting in the first clutch C1 and the fourth clutch C0, as two friction engagement elements, and the first brake B1 as another friction engagement element, being engaged at the same time, interlock occurs in the transmission device 13.

Here, to prevent the first clutch C1, the fourth clutch C0, and the first brake B1 from being engaged at the same time, therefore, the clutch application control valve 66 shuts off the supply of the C-1 control pressure $P_{C1}$ to the hydraulic servo C-1, the supply of the C-0 control pressure $P_{C0}$ to the hydraulic servo C-0, and the supply of a hydraulic pressure to the B-1 control valve 55 when an attempt is made to carry out a sequence of simultaneously supplying the C-1 control pressure $P_{C1}$ to the hydraulic servo C-1, the C-0 control pressure $P_{C0}$ to the hydraulic servo C-0, and the B-1 control pressure $P_{B1}$ to the hydraulic servo B-1.

To accomplish the foregoing, the B-1 application control valve 62 is provided with spools a and b and the spool a is provided with lands a1 to a5. Land a3 forms a signal hydraulic chamber e3, land a4 forms a signal hydraulic chamber e4, land a5 forms a signal hydraulic chamber e5, and spool b forms a signal hydraulic chamber e. Further, a spring f is disposed to abut against the land a1. If the areas of lands a1 to a5 are Su1 to Su5, the areas Su1 to Su5 are to meet the following expressions:

$$Su1=Su2$$

$$Su1=Su3$$

$$Su1>Su4$$

$$Su1>Su5.$$

Under normal conditions, therefore, the line pressure $P_L$ is supplied to the signal hydraulic chamber e and the line pressure $P_L$ pushes the spools a and b so that the B-1 application control valve 62 takes the left-hand half position. The spring f pushes the spool a so that the B-1 application control valve 62 takes the left-hand half position.

The clutch application control valve 66 is provided with a spool a and the spool a is provided with lands a1 to a6. Land a1 forms a signal hydraulic chamber e1, land a2 forms a signal hydraulic chamber e2, land a3 forms a signal hydraulic chamber e3, and land a6 forms a signal hydraulic chamber e6. Further, a spring f is disposed so as to abut against the land a6. If the areas of lands a1 to a6 are Su1 to Su6, the areas Su1 to Su6 are to meet the following expressions:

Su1<Su2

Su1<Su3

Su1=Su4

Su1=Su5

Su1=Su6.

Then, the 4-5 shift valve 61 is provided with spools a and b and the spool a is provided with lands a1 to a4. Land a1 forms a signal hydraulic chamber e1, land a4 forms a signal hydraulic chamber e4, and spool b forms a signal hydraulic chamber e. Further, a spring f is disposed to abut against the land a4. In the first to the fourth speeds of the low-speed positions and in the neutral and reverse positions, the solenoid of the fourth solenoid valve S4 is turned OFF, the signal hydraulic pressure $P_{S4}$ is not supplied to the signal hydraulic chamber e1, and the 4-5 shift valve 61 takes the left-hand half position. Further, in the fifth speed of the high-speed position, the solenoid of the fourth solenoid valve S4 is turned ON, the signal hydraulic pressure $P_{S4}$ is supplied to the signal hydraulic chamber e1, and the 4-5 shift valve 61 takes the right-hand half position. The 4-5 shift valve 61, when in the left-hand half position, makes the gear ratio of the sub-transmission 24 larger and, when in the right-hand half position, makes the gear ratio of the sub-transmission 24 smaller.

When the C-1 control pressure $P_{C1}$ is generated in this case, the C-1 control pressure $P_{C1}$ is supplied to the signal hydraulic chamber e1 of the clutch application control valve 66 through oil passages L-35 and L-81 and the clutch application control valve 66 takes the left-hand half position. Then, the C-1 control pressure $P_{C1}$ is supplied to the clutch application control valve 66 through oil passages L-35 and L-55, and also to the hydraulic servo C-1 through the oil passage L-57.

Also, when the C-0 control pressure $P_{C0}$ is generated in this case, the C-0 control pressure $P_{C0}$ is supplied to the signal hydraulic chamber e3 of the clutch application control valve 66 through oil passages L-37 and L-38 and the clutch application control valve 66 takes the left-hand half position. The C-0 control pressure $P_{C0}$ is supplied to the clutch application control valve 66 through oil passages L-37 and L-52, and also to the hydraulic servo C-0 through the oil passage L-53.

When the C-1 control pressure $P_{C1}$, C-0 control pressure $P_{C0}$, and the B-1 control pressure $P_{B1}$ are generated at the same time, the C-1 control pressure $P_{C1}$ is supplied through the oil passage L-63 and C-0 control pressure $P_{C0}$ is supplied through the oil passage L-62 to the signal hydraulic chambers e4 and e5, respectively, of the B-1 application control valve 62. This involves the spool a being pushed by a force corresponding to the difference in area between lands a4 and a5, and a force corresponding to the area of the land a5 so that the B-1 application control valve 62 takes the right-hand half position. In addition, the B-1 control pressure $P_{B1}$ is supplied to the B-1 application control valve 62 through the oil passage L-25, delivered once to the oil passage L-71, and, through the oil passage L-71, is supplied again to the signal hydraulic chamber e3 of the B-1 application control valve 62. Consequently, the spool a is pushed by a force corresponding to the difference in area between lands a3 and a4 so that the B-1 application control valve 62 takes the right-hand half position.

At this time, the spool a is pushed to counteract the line pressure $P_L$ supplied to the signal hydraulic chamber e and the spring load of the spring f, causing the B-1 application control valve 62 to take the right-hand half position. As a result, with the B-1 application control valve 62, a failure is detected to have occurred in the solenoid valve or control valve as hydraulic pressure supply means, and the oil passage L-73 is brought into communication with the oil passage L-64. Then, the D range pressure $P_D$, as the fail-safe pressure $P_{FS}$ indicating that a failure has occurred in the solenoid valve or the control valve is generated at a port P-64 as an output portion. The fail-safe pressure $P_{FS}$ is supplied to the clutch application control valve 66 through oil passages L-64 and L-79. The fail-safe pressure $P_{FS}$ supplied to the clutch application control valve 66 works with the spring f to push, with a force corresponding to the area of the land a6, the spool a so that the clutch application control valve 66 takes the right-hand half position. This results in the clutch application control valve 66 taking the right-hand half position.

The signal hydraulic chambers e4 and e5 connected to oil passages L-63 and L-62 at the B-1 application control valve 62 form a first hydraulic pressure detection portion that detects that the C-0 control pressure $P_{C0}$ and the C-1 control pressure $P_{C1}$ have been generated and the signal hydraulic chamber e3 forms a second hydraulic pressure detection portion that detects that the B-1 control pressure $P_{B1}$ has been generated. The first and the second hydraulic pressure detection portions detect that the C-1 control pressure $P_{C1}$, C-0 control pressure $P_{C0}$, and the B-1 control pressure $P_{B1}$ are generated at the same time in the hydraulic servos C-1, C-0, and B-1. The signal hydraulic chamber e6 connected to oil passage L-79 in the clutch application control valve 66 forms a hydraulic pressure supply detection portion that detects that the C-1 control pressure $P_{C1}$, C-0 control pressure $P_{C0}$, and the B-1 control pressure $P_{B1}$ have been supplied at the same time to the B-1 application control valve 62.

At this time, the oil passage L-26 and the oil passage L-24 are shut off and the D range pressure $P_D$ is no longer supplied to the B-1 control valve 55. The B-1 control pressure $P_{B1}$ is not therefore generated at the B-1 control valve 55 and the B-1 control pressure $P_{B1}$ is not supplied to the hydraulic servo B-1. In this case, a port P-24 connected to the oil passage L-24 in the clutch application control valve 66 forms a hydraulic pressure non-supply portion.

As a consequence of the B-1 application control valve 62 taking the right-hand half position, the oil passage L-25 and the oil passage L-71 are shut off. Meanwhile, the oil passage L-72 is brought into communication with the oil passage L-71, allowing the D range pressure $P_D$ to be supplied to the B-1 application control valve 62 through the oil passage L-71. The D range pressure $P_D$ pushes the spool a with a force corresponding to the difference in area between lands a3 and a4 so that the B-1 application control valve 62 takes the right-hand half position. The B-1 application control valve 62 therefore is maintained at the right-hand half position.

Then, when the clutch application control valve 66 takes the right-hand half position, the oil passage L-55 and the oil passage L-57 are shut off and the oil passage L-52 and the oil passage L-53 are shut off, thus stopping the supply of the C-1 control pressure $P_{C1}$ and the C-0 control pressure $P_{C0}$ to the hydraulic servos C-1 and C-0, respectively. However, the D range pressure $P_D$ is supplied to the clutch application control valve 66 through the oil passage L-40 and to the hydraulic servo C-1 through the oil passage L-57. In addition, the D range pressure $P_D$ is supplied to the clutch application control valve 66 through oil passages L-40 and L-61 and, further, to the hydraulic servo C-0 through the oil passage L-53. In this manner, the first clutch C1 and the fourth clutch C0 can be engaged. Input ports P-55 and P-52 connected to the oil passages L-55 and L-52 in the clutch application control valve 66 make up an input portion, while output ports P-57 and P-53 connected to oil passages L-57 and L-53 make up an output portion.

In this way, simultaneous supply of the C-1 control pressure $P_{C1}$, C-0 control pressure $P_{C0}$, and the B-1 control pressure $P_{B1}$ to hydraulic servos C-1, C-0, and B-1, respectively is prevented. As a result, the first clutch C1, the fourth clutch C0, and the first brake B1 will not engage at the same time, thus preventing interlock from occurring in the transmission device 13.

In the B-1 application control valve 62, the areas of the lands a1 to a5 and the spring load of the spring f are set so that the B-1 application control valve 62 takes the right-hand half position when all of the C-1 control pressure $P_{C1}$, C-0 control pressure $P_{C0}$, and B-1 control pressure $P_{B1}$ are supplied to the B-1 application control valve 62 and so that the B-1 application control valve 62 takes the left-hand half position when only two among the C-1 control pressure $P_{C1}$, C-0 control pressure $P_{C0}$, and B-1 control pressure $P_{B1}$ are supplied to the B-1 application control valve 62.

Also, in the clutch application control valve 66, the areas of the lands a1 to a6 and the spring load of the spring f are set so that the clutch application control valve 66 takes the left-hand half position when at least either one of the C-1 control pressure $P_{C1}$ and C-0 control pressure $P_{C0}$ is supplied to the clutch application control valve 66 when the fail-safe pressure $P_{FS}$ is not supplied through oil passages L-64 and L-79 and so that the clutch application control valve 66 takes the right-hand half position when the fail-safe pressure $P_{FS}$ is supplied through oil passages L-64 and L-79.

As described above, not all of the first clutch C1, the fourth clutch C0, and the first brake B1 are engaged even if the C-1 control pressure $P_{C1}$, C-0 control pressure $P_{C0}$, and the B-1 control pressure $P_{B1}$ are generated at the same time; instead, only the first clutch C1 and the fourth clutch C0 are engaged. At this time, however, if a failure occurs in the fourth solenoid valve S4 or the solenoid relay valve 56, causing the signal hydraulic pressure $P_{S4}$ to be no longer supplied to the signal hydraulic chamber e1 of the 4-5 shift valve 61 and, as a result, the 4-5 shift valve 61 takes the left-hand half position, the line pressure $P_L$ is supplied to the 4-5 shift valve 61 through the oil passage L-51 and to the hydraulic servo B-3 through the oil passage L-98, thus engaging the third brake B3.

As a result, the sub-transmission 24 is placed in an underdrive condition, selecting the low-speed position side. The gear ratio is set to a small value when the sub-transmission 24 is set in the underdrive condition, assuming a condition in which the vehicle will be reversed. This forces the transmission device 13 into the low-speed position side.

When the C-1 control pressure $P_{C1}$, C-1 control pressure $P_{C0}$, and B-1 control pressure $P_{B1}$ are generated at the same time, the fail-safe pressure $P_{FS}$ generated at the B-1 application control valve 62 is supplied to the clutch application control valve 66 through oil passages L-64 and L-79 and, at the same time, to the signal hydraulic chamber e of the 4-5 shift valve 61 through the oil passage L-65. At this time, spools a and b are pushed to counteract the 2 range pressure $P_{2L}$ supplied to the signal hydraulic chamber e4 and the spring load of the spring f, causing the 4-5 shift valve 61 to take the right-hand half position. This results in the communication between oil passages L-51 and L-98 being shut off, and the oil passage L-98 is brought into communication with the drain port through the 4-5 shift valve 61, thus allowing the hydraulic pressure of the hydraulic servo B-3 to be drained. The third brake B3 is disengaged in this manner.

Also, though the oil passage L-99 has been made into communication with the drain port through the 4-5 shift valve 61, the shift valve 61 taking the right-hand half position brings the oil passage L-99 into communication with the oil passage L-68. As a result, the D range pressure $P_D$ is supplied to the hydraulic servo C-3 through oil passages L-11, L-40, L-68, and L-99 to engage the third clutch C3.

In this case, the first clutch C1 and the fourth clutch C0 are engaged in the main transmission 23 and the main transmission 23 is directly coupled to provide a small gear ratio and, at the same time, the third clutch C3 is engaged in the sub-transmission 24 and the sub-transmission 24 is directly coupled to provide a small gear ratio, thus making the gear ratio of the transmission device 13 small. Accordingly, in the transmission device 13, a gearshift position approximating the fourth speed, that is, an approximate fourth speed can be achieved as a predetermined gearshift position on the high-speed position side. In this case, the gear ratio of the approximate fourth speed is set to a value close to the gear ratio of the fourth speed.

Accordingly, in an automatic transmission having a low-speed position such as first speed and second speed, a mid-speed position such as third speed, a predetermined gearshift position on the high-speed position side such as the approximate fourth speed, and a high-speed position such as the fourth speed and the fifth speed, if, for example, the C-1 control pressure $P_{C1}$, C-1 control pressure $P_{C0}$, and the B-1 control pressure $P_{B1}$, are generated at the same time while the vehicle is being drive in a high-speed position, the 4-5 shift valve 61 and the clutch application control valve 66 not only prevent interlock from occurring in the transmission device 13, thus preventing a neutral condition from being established, but also prevent gearshifting from a high-speed position to a low-speed position. In an automatic transmission having a low-speed position, middle-speed position, and a high-speed position, it is possible to achieve the middle-speed position by preventing gearshifting from the high-speed position to the low-speed position, and to achieve a predetermined gearshift position on the high-speed position side. As a result, the possibility of large engine braking being applied is eliminated, thus effectively preventing gearshift shock from occurring.

According to this embodiment, the gear ratio is made small in the main transmission 23 and the sub-transmission 24 so that the overall gear ratio of the transmission device 13 is made small, thereby preventing a gearshift shock from occurring. It is nonetheless possible to make small the overall gear ratio of the transmission device 13 by making small the gear ratio of only one of either the main transmission 23 and the sub-transmission 24, thereby preventing gearshift shock from occurring.

To achieve a predetermined gearshift position, it is necessary to supply a hydraulic pressure to the hydraulic servo of a predetermined friction engagement element selected in accordance with the gearshift position. If, however, any of the first to the third solenoid valves SL1 to SL3, or any of the control valves of the B-1 control valve 55, C-1 control valve 57, and C-0 control valve 64 is placed in a non-supply state in which it is unable to supply a hydraulic pressure to each of the hydraulic servos, resulting in a failure occurring, then a neutral condition is established in the transmission device 13.

For example, in the first speed and second speed in the forward range, the first clutch C1 is engaged. If, however, a failure occurs such as valve sticking in the C-1 control valve 57, it becomes unable to generate the C-1 control pressure $P_{C1}$ and, accordingly, the C-1 control pressure $P_{C1}$ is not supplied to the clutch application control valve 66. As a result, the first clutch C1 cannot be engaged and a neutral condition is established in the transmission device 13 and it becomes impossible to achieve the first speed or the second speed.

According to this embodiment, therefore, if the C-1 control pressure $P_{C1}$ is not generated and, in the clutch application control valve 66, if the C-1 control pressure $P_{C1}$ is no longer supplied to the signal hydraulic chamber e1 through the oil passage L-81, the spool a is pushed by the spring f, causing the clutch application control valve 66 to take the right-hand half position. The D range pressure $P_D$, as another hydraulic pressure, is then supplied to the clutch application control valve 66 through the oil passage L-40 and to the hydraulic servo C-1 through the oil passage L-57. At the same time, the D range pressure $P_D$ is supplied to the clutch application control valve 66 through oil passages L-40 and L-61 and also to the hydraulic servo C-0 through the oil passage L-53.

As a result, the first clutch C1 and the fourth clutch C0 are engaged in the main transmission 23 and the main transmission 23 is directly coupled to provide a small gear ratio, thus making small the gear ratio of the transmission device 13. Then, in the transmission device 13, the third speed is achieved as a predetermined gearshift position on the high-speed position side.

Also, in the third speed in the forward range, the first clutch C1 and the fourth clutch C0 are engaged. If, however, a failure occurs such as valve sticking in the C-1 control valve 57, for example, it becomes unable to generate the C-1 control pressure $P_{C1}$ and, accordingly, the C-1 control pressure $P_{C1}$ is not supplied to the clutch application control valve 66. As a result, the first clutch C1 cannot be engaged and the neutral condition is established in the transmission device 13, and the third speed cannot be achieved.

Here, in the third speed, if a failure such as valve sticking does not occur in the C-0 control valve 64, the C-0 control pressure $P_{C0}$ is generated and supplied to the signal hydraulic chamber e3 through oil passages L-37 and L-38. Even if the C-1 control pressure $P_{C1}$ is not generated and not supplied to the signal hydraulic chamber e1 through the oil passage L91, therefore, the spool a is kept as it is at the left-hand half position.

There, neutral condition detection and processing means of the control unit reads the speed of the input shaft 16 detected by an input shaft speed detection sensor as the input shaft speed $N_1$ and the speed of the output gear 35 detected by an output shaft speed detection sensor as the output shaft speed $N_0$ and calculates an actual gear ratio g of the actual transmission device 13, $g = N_1/N_0$, and compares the actual gear ratio g with a theoretical gear ratio $g_{TH}$ of the transmission device 13.

The neutral condition detection and processing means determines whether the difference Dg between the actual gear ratio g and the theoretical gear ratio $g_{TH}$, $Dg = g - g_{TH}$ falls within a predetermined range. If the difference Dg falls within the predetermined range, a neutral condition is not detected and a controllable friction engagement element is engaged to achieve a predetermined gearshift position. If the difference Dg does not fall within the predetermined range, a neutral condition is detected. If a neutral condition is detected, solenoid valve drive and processing means of the control unit sets the value of the first solenoid signal SG1, the second solenoid signal SG2, and the third solenoid signal SG3 to zero (0) to turn each of these solenoids OFF. According to this embodiment, the first to the third solenoid valves SL1 to SL3 are normally-open type solenoid valves, which means that a signal hydraulic pressure is generated when each of these solenoids is turned OFF, thus generating the C-1 control pressure $P_{C1}$, C-1 control pressure $P_{C0}$, and the B-1 control pressure $P_{B1}$.

As described earlier, the B-1 application control valve 62 and the clutch application control valve 66 take the right-hand half position in this case, and the B-1 control pressure $P_{B1}$ is no longer generated at the B-1 control valve 55, and thus the B-1 control pressure $P_{B1}$ is not supplied to the hydraulic servo B-1. In the clutch application control valve 66, the D range pressure $P_D$ as another hydraulic pressure is supplied to the hydraulic servos C-1 and C-0. The 4-5 shift valve 61 receives the fail-safe pressure $P_{FS}$ to switch to the right-hand half position and, in the 4-5 shift valve 61, the D range pressure $P_D$ is supplied to the hydraulic servo C-3. As a result, the first clutch C1 and the fourth clutch C0 are engaged in the main transmission 23 and the third clutch C3 is engaged in the sub-transmission 24. Then, the gear ratios of the main transmission 23 and sub-transmission 24 are made small, making the gear ratio of the transmission device 13 small. Then, in the transmission device 13, the approximate fourth speed is achieved as a predetermined gearshift position on the high-speed position side.

Also, in the fourth speed and the fifth speed in the forward range, the fourth clutch C0 and the first brake B1 are engaged. If, however, a failure such as valve sticking occurs in the C-0 control valve 64, and B-1 control valve 66, the C-0 control pressure $P_{C0}$ or B-1 control pressure $P_{B1}$ is not generated and, accordingly, the C-0 control pressure $P_{C0}$ or B-1 control pressure $P_{B1}$ is not supplied to the B-1 application control valve 62 and the clutch application control valve 66. As a result, the fourth clutch C0 and the first brake B1 cannot be engaged and the neutral condition is established in the transmission device 13, and it becomes impossible to achieve the fourth speed and the fifth speed.

According to this embodiment, therefore, if the C-0 control pressure $P_{C0}$ is not generated and, in the clutch application control valve 66, if the C-0 control pressure $P_{C0}$ is no longer supplied to the signal hydraulic chamber e3 through the oil passage L-38, the spool a is pushed by the spring f, causing the clutch application control valve 66 to take the right-hand half position. Accordingly, the D range pressure $P_D$ as another hydraulic pressure is then supplied to the clutch application control valve 66 through the oil passage L-40 and to the hydraulic servo C-1 through the output port P-57 and the oil passage L-57. At the same time, the D range pressure $P_D$ is supplied to the clutch application control valve 66 through oil passages L-40 and L-61 and also to the hydraulic servo C-0 through the output port P-53 and the oil passage L-53. As a result, the first clutch C1 and the fourth clutch C0 are engaged in the main transmission 23 and the main transmission 23 is directly coupled to provide a small gear ratio, thus making small the gear ratio of the transmission device 13. Then, in the transmission device 13, the third speed is achieved as a predetermined gearshift position on the high-speed position side.

In the fifth speed of the forward range, when the solenoid of the fourth solenoid valve S4 is turned ON, the signal hydraulic pressure $P_{S4}$ is supplied to the 4-5 shift valve 61 and the 4-5 shift valve 61, which has been in the left-hand half position, takes the right-hand half position with the spool b remaining as it was. In this case, the D range pressure $P_D$ supplied as another hydraulic pressure to the 4-5 shift valve 61 through the oil passage L-68 is supplied to the hydraulic servo C-3 through the oil passage L-99. This results in the first clutch C1 and the fourth clutch C0 being engaged and, at the same time, the third clutch C3 being engaged, and the gear ratios of the main transmission 23 and sub-transmission 24 are made small, making the gear ratio of the transmission device 13 small. The approximate fourth speed is then achieved as a predetermined gearshift position on the high-speed position side.

Also, if the B-1 control pressure $P_{B1}$ is not generated, the neutral condition detection and processing means determines whether the difference Dg falls within a predetermined range. If the difference Dg falls within the predetermined range, a neutral condition is not detected and a friction engagement element, in which no failure has occurred, is engaged to achieve a predetermined gearshift position. If the difference Dg does not fall within the predetermined range, a neutral condition is detected.

Then, if a neutral condition is detected, the solenoid valve drive and processing means sets the value of the first solenoid signal SG1, the second solenoid signal SG2, and the third solenoid signal SG3 to zero (0) to turn each of these solenoids OFF, thereby generating the C-1 control pressure $P_{C1}$, C-0 control pressure $P_{C0}$, and the B-1 control pressure $P_{B1}$.

As described earlier, the B-1 application control valve 62 and the clutch application control valve 66 take the right-hand half position in this case, and the B-1 control pressure $P_{B1}$ is no longer generated at the B-1 control valve 55, and thus the B-1 control pressure $P_{B1}$ is not supplied to the hydraulic servo B-1. In the clutch application control valve 66, the D range pressure $P_D$ as another hydraulic pressure is supplied to the hydraulic servos C-1 and C-0. The 4-5 shift valve 61 receives the fail-safe pressure $P_{FS}$ and switches to the right-hand half position and, in the 4-5 shift valve 61, the D range pressure $P_D$ is supplied to the hydraulic servo C-3. As a result, the first clutch C1 and the fourth clutch C0 are engaged in the main transmission 23 and the third clutch C3 is engaged in the sub-transmission 24, and the gear ratios of the main transmission 23 and sub-transmission 24 are made small, making the gear ratio of the transmission device 13 small. Then, in the transmission device 13, the approximate fourth speed is achieved as a predetermined gearshift position on the high-speed position side.

In this way, if any of the C-1 control pressure $P_{C1}$, C-0 control pressure $P_{C0}$, and B-1 control pressure $P_{B1}$ that is required for achieving a gearshift position cannot be generated, the predetermined hydraulic pressure can be supplied to a hydraulic servo to achieve the gearshift position corresponding to that hydraulic servo, thus preventing a neutral condition from being established in the transmission device 13.

Furthermore, since the third speed can be achieved by engaging the first clutch C1 and the fourth clutch C0 as the two friction engagement elements, it is possible to prevent gearshifting from a high-speed position of the fourth speed or fifth speed to a low-speed position in the transmission device 13. As a result, the possibility of a large engine braking being applied is eliminated, thus preventing gearshift shock from occurring. In addition, the approximate fourth speed can be achieved by engaging the third clutch C3, which even further helps prevent gearshift shock from occurring.

It should be understood that the invention is not limited to the embodiments, but may be otherwise variously embodied within the spirit and scope of this invention.

What is claimed is:

1. A hydraulic control unit for an automatic transmission, comprising:

a hydraulic servo for engaging and disengaging each friction engagement element;

hydraulic pressure supply means for supplying a hydraulic pressure to the hydraulic servo of a predetermined friction engagement element selected according to a gearshift position to be achieved;

failure detection means for detecting a failure in the hydraulic pressure supply means; and fail-safe means for preventing interlock from occurring due to a plurality of friction engagement elements engaging and prevents a gearshift from a high-speed gear position to a low-speed gear position when the failure detection means detects a failure, wherein the fail-safe means is provided with a first selector valve that, according to selection, supplies or exhausts a hydraulic pressure to or from a plurality of hydraulic servos and a second selector valve that, according to selection, takes a first selector position at which a gear ratio is made larger and a second selector position at which the gear ratio is made smaller, and the fail-safe pressure causes the first selector valve to switch such that a hydraulic pressure is supplied to the hydraulic servo of each of the two clutches and the second selector valve to switch to the second selector position when the fail-safe pressure is supplied.

2. The hydraulic control unit for an automatic transmission according to claim 1, wherein the failure detection means is a failure detection valve provided with a hydraulic pressure detection portion that detects if hydraulic pressures supplied to a plurality of hydraulic servos are generated simultaneously, and an output portion that generates a fail-safe pressure indicating a failure when hydraulic pressures supplied to the plurality of hydraulic servos have been generated simultaneously and outputs the fail-safe pressure to the fail-safe means.

3. The hydraulic control unit for an automatic transmission according to claim 2, wherein the failure detection means detects if hydraulic pressures supplied to a hydraulic servo for each of two clutches and one brake are generated simultaneously.

4. The hydraulic control unit for an automatic transmission according to claim 1, wherein the second selector valve allows a vehicle to drive in reverse when in the first selector position and prevents the vehicle from driving in reverse when in the second selector position.

5. A hydraulic control unit for and automatic transmission, comprising:

a hydraulic servo for engaging and disengaging each friction engagement elements;

hydraulic pressure supply means for supplying hydraulic pressure to the hydraulic servo of a predetermined friction engagement element selected according to a gearshift position to be achieved;

failure detection means for detecting a failure has occurred in the hydraulic pressure supply means; and fail-safe means for preventing a neutral condition and prevents a gearshift from a high-speed gear position to a low-speed gear position when the failure detection means detects a failure, wherein the fail-safe means is provided with a first selector valve that, according to selection, supplies or exhausts a hydraulic pressure to or from a plurality of hydraulic servos and a second selector valve that, according to selection, takes a first selector position at which a gear ratio is made larger and a second selector position at which the gear ratio is made smaller, and the fail-safe pressure causes the first selector valve to switch such that a hydraulic pressure is supplied to the hydraulic servo of each of the two clutches and the second selector valve to switch to the second selector position when the fail-safe pressure is supplied.

6. The hydraulic control unit for an automatic transmission according to claim 5, wherein the failure detection means is a failure detection valve that is provided with a hydraulic pressure detection portion that detects if hydraulic pressures supplied to a plurality of hydraulic servos are generated simultaneously, and an output portion that generates a fail-safe pressure indicating a failure when hydraulic pressures to be supplied to the plurality of hydraulic servos have been generated simultaneously and outputs the fail-safe pressure to the fail-safe means.

7. The hydraulic control unit for an automatic transmission according to claim 6, wherein the failure detection means detects if hydraulic pressures supplied to a hydraulic servo for each of two clutches and one brake are generated simultaneously.

8. The hydraulic control unit for an automatic transmission according to claim 5, wherein the second selector valve allows a vehicle to drive in reverse when in the first selector position and prevents the vehicle from driving in reverse when in the second selector position.

9. A hydraulic control unit for an automatic transmission, comprising:

a hydraulic servo for engaging and disengaging each friction engagement element of a plurality of friction engagement elements;

hydraulic pressure supply means for supplying hydraulic pressure to a hydraulic servo of a predetermined friction engagement element selected according to a gearshift position to be achieved;

failure detection means for detecting a failure in the hydraulic pressure supply means; and fail-safe means for preventing interlock from occurring due to a plurality of friction engagement elements engaging, prevents a neutral condition from being established, and also prevents a gearshift from a high-speed gear position to a low-speed gear position when the failure detection means detects a failure, wherein the fail-safe means is provided with a first selector valve that, according to selection, supplies or exhausts a hydraulic pressure to or from a plurality of hydraulic servos and a second selector valve that, according to selection, takes a first selector position at which a gear ratio is made larger and a second selector position at which the gear ratio is made smaller, and the fail-safe pressure causes the first selector valve to switch such that a hydraulic pressure is supplied to the hydraulic servo of each of the two clutches and the second selector valve to switch to the second selector position when the fail-safe pressure is supplied.

10. The hydraulic control unit for an automatic transmission according to claim 9, wherein the failure detection means is a failure detection valve that is provided with a hydraulic pressure detection portion that detects if hydraulic pressures supplied to a plurality of hydraulic servos are generated simultaneously, and an output portion that generates a fail-safe pressure indicating a failure when hydraulic pressures supplied to the plurality of hydraulic servos have been generated simultaneously and outputs the fail-safe pressure to the fail-safe means.

11. The hydraulic control unit for an automatic transmission according to claim 10, wherein the failure detection means detects if hydraulic pressures supplied to the hydraulic servo for each of two clutches and one brake are generated simultaneously.

12. The hydraulic control unit for an automatic transmission according to claim 9, wherein the second selector valve allows a vehicle to drive in reverse when in the first selector position and prevents the vehicle from driving in reverse when in the second selector position.

* * * * *